April 29, 1952 Z. H. MOORES 2,595,091

FRAME FOR ROTARY GROUND PULVERIZERS

Filed April 16, 1947 2 SHEETS—SHEET 1

INVENTOR.
Zach H. Moores
BY *Victor J. Evans & Co.*
ATTORNEYS

April 29, 1952     Z. H. MOORES     2,595,091
FRAME FOR ROTARY GROUND PULVERIZERS
Filed April 16, 1947     2 SHEETS—SHEET 2
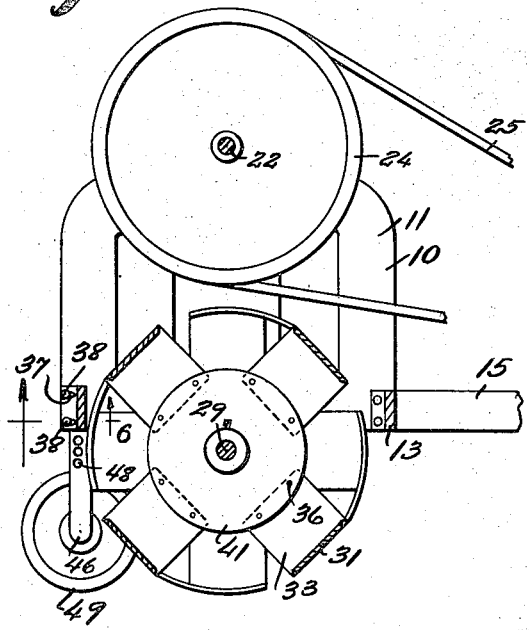
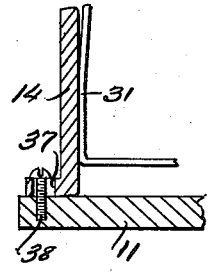
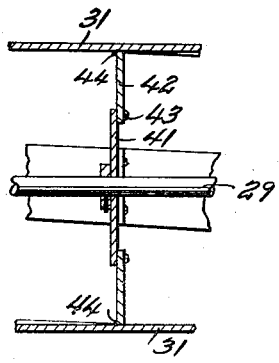
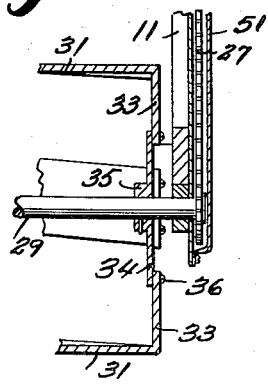
INVENTOR.
Zach H. Moores
BY *Victor J. Evans & Co.*
ATTORNEYS Patented Apr. 29, 1952

2,595,091

UNITED STATES PATENT OFFICE 2,595,091

FRAME FOR ROTARY GROUND PULVERIZERS

Zach H. Moores, Texarkana, Tex.

Application April 16, 1947, Serial No. 741,713

1 Claim. (Cl. 97—233)

This invention relates to ground slicers and pulverizers.

It is an object of the present invention to provide a ground slicer and pulverizer formed of a plurality of cutting blades of thin strips with cutting edges on opposite sides of the same and with these blades skewed as a lawn mower so as to strike the dirt at an angle in a lawn mower or shear-like fashion and wherein there is provided on the frame on which the blades are rotated an adjustable cleaning bar for removing the soil from the blades.

Other objects of the present invention are to provide a ground slicer and pulverizer which is of simple construction, inexpensive to manufacture and efficient in operation.

For other objects and for a better understanding of the invention, reference may be had to the following detailed description taken in connection with the accompanying drawing, in which Fig. 1 is a side elevational view of my ground slicer and pulverizer with a portion of the driving chain casing broken away to show the interior of the same.

Fig. 3 is a longitudinal cross-sectional view taken on line 3—3 of Fig. 2.

Fig. 4 is a fragmentary cross-sectional view taken through the center of the reel and showing the connection of the blades with a center wheel.

Fig. 5 is a cross-sectional view showing the reel and the driving connection therewith, the view being taken at one end of the reel.

Fig. 6 is a detail fragmentary and cross-sectional view showing the engagement of the cutting blade with the cleaning blade and as viewed on line 6—6 of Fig. 3.

Figure 1:
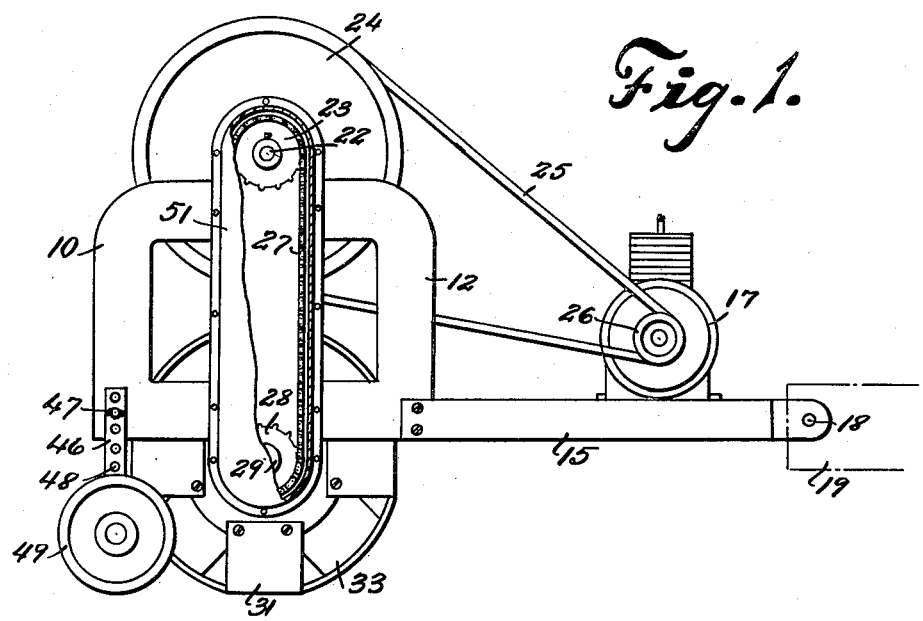
Figure 2:
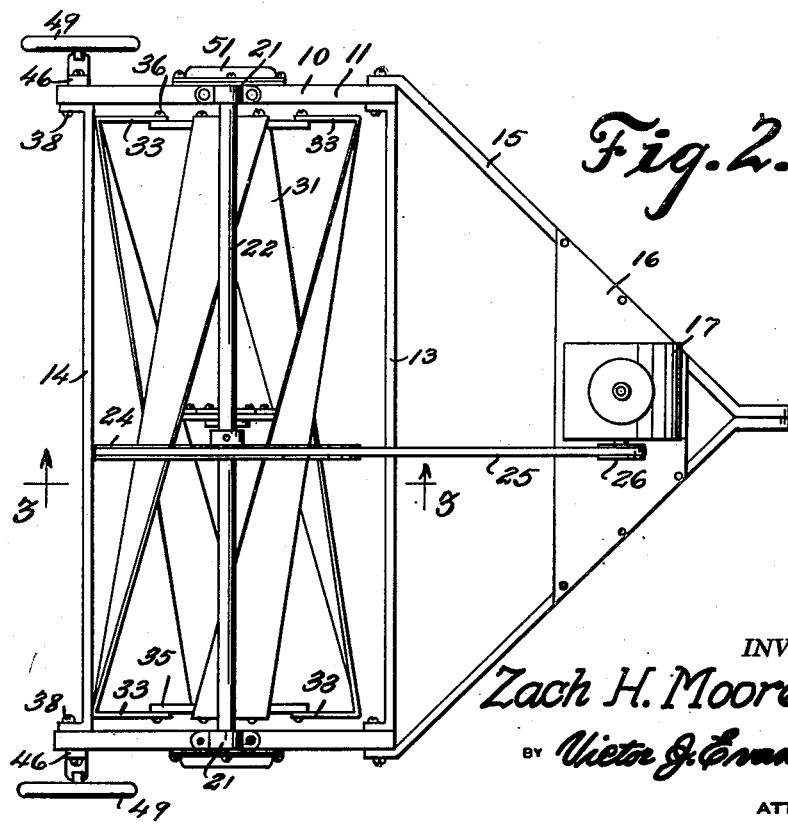
Fig. 2 is a top plan view of the machine shown in Fig. 1.

Referring now to the figures, 10 represents a frame having vertically extending side plates 11 and 12 and transversely extending forward and rear members 13 and 14. Connected to the forward end of the plates 11 and 12 is a draft structure 15 having a platform 16 on its forward end for supporting a power plant 17. The forward end of the draft structure 16 has an opening 18 through which a pin can be extended for connecting the machine to the rear end of a tractor as indicated at 19.

On the top edges of the plates 11 are brackets 21 in which are journalled a shaft 22 having sprockets 23 thereon, there being one sprocket at each end of the shaft. At the center of the shaft is a large pulley wheel 24 which is connected by a belt 25 to a driving pulley 26 of the power plant 17. Shaft 22 is accordingly turned and the sprockets 23 are connected by a chain 27 with a sprocket 28 on a shaft 29 which carries pulverizing blades 31.

There are a plurality of blades 31 each of which, having a double cutting edge adapted to slice into the soil. These blades 31 are set askew in a lawn mower fashion so that the entire cutting edge of the blade does not enter the soil all at the same time but enters it gradually.

These blades 31 are formed of tempered steel and are bent downwardly at opposite ends as indicated at 33 for connection with disc 34 which lock to shaft 29 through a set collar 35. The inbent portions 33 are connected to the disc by rivets 36.

The rear transverse member of the frame 10 serves as a cleaning device for cleaning the soil from the bottom faces of the cutting blades 31 as the blades are rotated across the same. This transverse member 14 is mounted on the vertically extending frame pieces 11 and 12 for fore and aft adjustment as by means of slots 37 and retaining screws 38.

Referring now to Fig. 4, there is shown a central support for the blades. This central support comprises a disc 41 connected to the shaft 22 and fastening plates 42 secured to the disc 41 by screws 43 and to the inner faces of the blades by welding 44.

On the rear end of the vertically extending pieces 11 and 12 are vertically adjustable strap members 46 adapted to be connected to the frame pieces by a screw 47 extended through any one of holes 48 in the strap. On the lower end of the strap are gauge wheels 49 which support the frame and govern the depth of slice of the soil by the cutting blades 31.

The chain 27 is enclosed by a separable casing 51 to prevent dirt from collecting on the chain 27.

It should be apparent that my ground slicer and pulverizer serves the purpose of a cross-row cotton chopper, a yard renovator, lawn slicer, and a row crop cultivator.

While various changes may be made in the detail construction, it shall be understood that such changes shall be within the spirit and scope of the present invention as defined by the appended claim.

I claim:

A frame for a ground slicer and pulverizer comprising open work side plates, transversely extending forward and rear members having flanged ends that are secured to the side plates at the front and rear edges thereof to place the side plates in parallel spaced relation to each other, a pair of angular members having flanges on the opposite ends thereof and secured at one of the flanged ends to the opposite forward ends of the side plates to provide a triangular shaped draft structure, a platform carried by the draft structure to support a motor, strap means adjustably connected to the opposite rear ends of the side plates, wheels attached to the strap means for supporting the frame and journal means carried by the upper edge of the side plates for journalling a driven shaft therein transversely of the frame.

ZACH H. MOORES.

REFERENCES CITED

The following references are of record in the file of this patent:

UNITED STATES PATENTS

| Number | Name | Date |
|---|---|---|
| 228,653 | Lee | June 8, 1880 |
| 1,740,321 | Vasconcellos | Dec. 17, 1929 |
| 1,742,988 | Fallman et al. | Jan. 7, 1930 |
| 2,268,923 | Bryant | Jan. 6, 1942 |
| 2,279,652 | Beard | Apr. 14, 1942 |